United States Patent [19]

Griffin et al.

[11] Patent Number: 5,506,072
[45] Date of Patent: Apr. 9, 1996

[54] REVERSIBLE HIGH ENERGY CAPACITY METAL-SULFUR BATTERY AND METHOD OF MAKING SAME

[75] Inventors: Eric B. Griffin, 4566 Hamilton St., San Diego, Calif. 92116; Jack V. Edling, Escondido, Calif.

[73] Assignee: Eric B. Griffen, San Diego, Calif.

[21] Appl. No.: 388,495

[22] Filed: Feb. 14, 1995

[51] Int. Cl.[6] .................. H01M 12/00; H01M 10/00
[52] U.S. Cl. .................. 429/188; 429/194; 429/197; 429/198
[58] Field of Search .................. 429/188, 192, 429/194, 197, 198

[56] References Cited

U.S. PATENT DOCUMENTS 3,993,503  11/1976  Ludwig .................. 429/103
4,025,699   5/1977  Silva et al. .................. 429/72
4,731,309   3/1988  Hoffman .................. 429/188

Primary Examiner—Stephen Kalafut
Assistant Examiner—Richard H. Lilley, Jr.
Attorney, Agent, or Firm—John R. Duncan; Frank D. Gilliam

[57] ABSTRACT

A reversible high energy capacity battery and method of making that battery. A cathode is formed by packing a mixture of from about 10 to 90 weight percent finely divided sulfur and from about 90 to 10 weight percent finely divided graphite about an electrically conductive electrode, preferably in a porous enclosure. This cathode and a reactive metal anode are placed in a case of suitable configuration which is non-reactive with other components. An electrolyte is prepared by dissolving a metal solute and an ionic sulfide solute in a polar solvent, such as water. Buffering agents, conditioners and complexing agents may be added to the electrolyte to improve battery life and performance.

27 Claims, 1 Drawing Sheet

REVERSIBLE HIGH ENERGY CAPACITY METAL-SULFUR BATTERY AND METHOD OF MAKING SAME

BACKGROUND OF THE INVENTION

This invention relates in general to electrical storage batteries and, more specifically, to high efficiency batteries using a metal anode, a sulfur containing cathode and an electrolyte solution comprising metal and sulfur ions.

A great many different battery structures and component compositions have been developed. Many are very effective for particular applications. Today, there is considerable interest in high capacity batteries with short recharge times for use in such applications as electrically powered automobiles. A number of different types of batteries have been proposed, or are in development for this type of application.

At present, lead-acid batteries are used because of their low cost and well developed technology Unfortunately, these batteries are heavy, consume considerable space, have poor energy storage and a short useful life. Typically, these batteries will power a small automobile for up to about 90 miles at low to moderate speeds, then require around 10 hours recharge time, although some advanced charging system may reduce the recharge time to around 2 hours.

Nickel-iron and nickel-cadmium batteries are also available now, with slightly greater duration of use and slightly shorter recharge time in automobile applications. They have a longer life and are compact compared to lead-acid batteries. However, the present cost of these batteries is relatively high and recharging is generally required after about 120 miles of driving.

Nickel-metal hydride batteries are under development and may be ready for automobile applications shortly. Miles between recharge cycles is approximately double that for lead-acid batteries and with relatively expensive charging systems, they can be recharge in as little as one hour. While energy storage is not great and costs are presently uncertain and likely to be high, at lest in the short run, these batteries have long lives and are maintenance free.

Other types of batteries, such as sodium-sulfur, zinc-air, lithium polymer, lithium-aluminum and iron-disulfide are in initial stages of development. Developers hope to achieve about 250–400 miles between recharges in automobile use, with recharge time of 5 hours or less. These batteries are expected to have high storage capacity. Unfortunately, some require high operating temperatures, and may not tolerate rapid recharging well.

Therefore, there is a continuing need for inexpensive reversible batteries having high energy storage, light weight and with rapid recharge ability for applications such as electrically powered automobiles.

SUMMARY OF THE INVENTION

The above-noted problems, and others, are overcome by the battery system of this invention, which basically comprises a case containing a unique combination of an anode and a novel cathode with a novel electrolyte between them. Basically, the anode is formed from a suitable reactive metal, or a non-metallic electrically conductive material plated with a reactive metal. The cathode basically comprises a mixture of finely divided sulfur and graphite, packed around a conductive electrode and covered with a porous separator. The electrolyte basically comprises a polar solvent having therein a metal ion solute and a sulfide ion solute. Preferably, the electrolyte further includes a complexing agent to increase the concentration of metal ions and a buffering agent to maintain the electrolyte pH in a desired range. The electrolyte may also include various agents to extend the life of the battery, enhance battery performance, resist freezing, etc.

The battery of this invention is very light weight and provides very high energy storage, approaching that of nuclear fuel cells. Use of the non-reactive plate material provides a very long and deep cycle life, eliminating electrode warping and break-down. Concentrated acids and hazardous metals need not be used, making recycling easy and simple. All components are abundant, readily available and relatively inexpensive.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
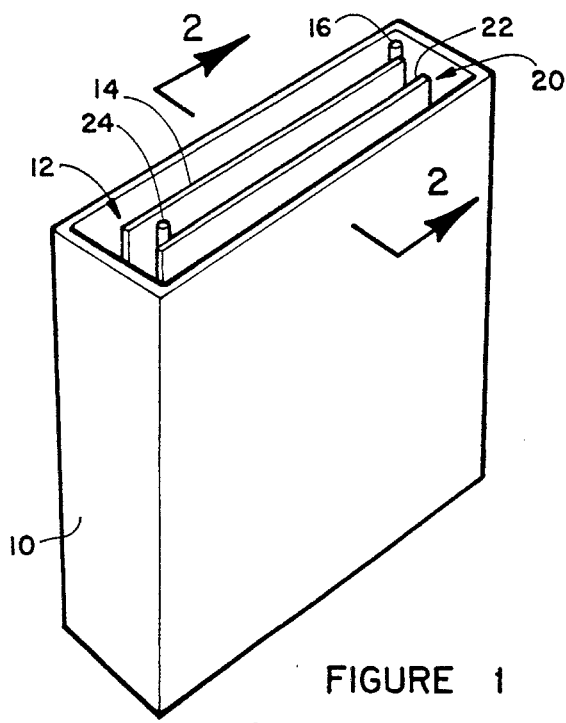
FIG. 1 is a schematic perspective of one cell of the battery of this invention with the top removed.

Referring to FIG. 1, there is seen a perspective view of a single-cell battery, which could be one of a number of cells in a battery which could have a plurality of cells connected in parallel or series.

This battery may be made up of one or a plurality of cells, which can have + and − terminals connected together in various ways to produce desired amperage and voltage characteristics. When increased amperage (capacity) is needed, the cell terminals are connected in parallel, positive to positive and negative to negative. When increased voltage is needed, the cells may be connected in series, positive to negative. A combination of these, a "series/parallel" system may be used to provide a variable increase or decrease in amperage or voltage.

The anode, cathode, electrolyte and other internal battery components are housed in a case 10 that is resistant to attack by the electrolyte solution. In the schematic embodiment shown, an anode 12 is in the form of a reactive metal, generally an alloy, sheet 14. A positive terminal 16 is secured to sheet 14 and extends through the battery top 18 (seen in FIG. 2). Cathode 20 here includes a graphite sheet 22, which may be solid or woven, with a negative terminal 24 secured to sheet 22.

Figure 2:
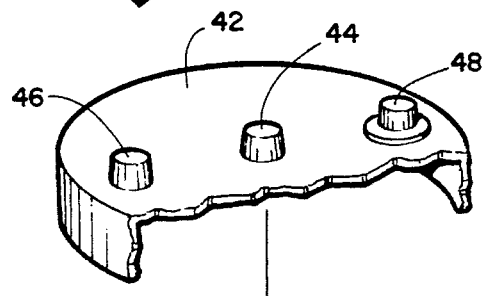
FIG. 2 is a schematic section view of the battery of FIG. 1, taken on line 2—2 in FIG. 1.

As seen in FIG. 2, cathode 20 further includes a mixture 26 of particulate sulfur and particulate carbon packed around electrode 22. A porous enclosure 28, preferably a woven bag, surrounds electrode 22 and maintains mixture 26 in contact with the electrode. If desired, enclosure 28 could be a housing formed from thin porous electrically insulating sheets.

An electrolyte 32 having the composition detailed below fills case 10 to near top 18 and is in intimate contact with electrodes 14 and 22 and saturates the packed sulfur/carbon mixture.

Top 18 fits closely over case 10 and supports electrodes 14 and 22 via terminals 16 and 24 which are preferably secured to the top. Both case 10 and top 18 are, of course, formed from an electrically insulating material. A pressure relief valve 30 is provided through top 18 to relieve any gas pressure that might develop within the battery.

With some component compositions and under certain conditions, hydrogen sulfide may be generated in a cell. In those cases it is preferred that a tube 31 extend from relief valve 30 to a small catalytic converter 33 that converts hydrogen sulfide to a less noxious compound in a conventional manner.

Figure 3:
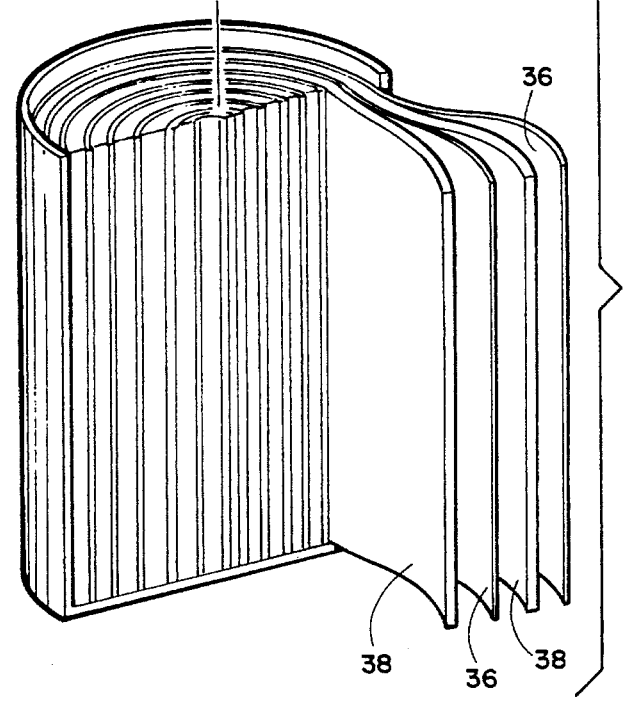
FIG. 3 is a schematic exploded perspective view of an alternative embodiment of the battery.

FIG. 3 shows an alternative embodiment of the internal arrangement of the battery, seen in a schematic perspective view, partially cut away to show internal structure. Battery materials are the same as those described above in conjunction with the description of FIGS. 1 and 2.

As seen in FIG. 3, the metal anode 36 is in the form of one or more flexible metal sheets, rolled up between cathode sheets 38. Each cathode includes an electrode, typically graphite, surrounded by a packed mixture of sulfur and graphite particles enclosed in a porous plastic sleeve, similar to that described above but thinner and planar.

The rolled cathode and anode, together with a liquid electrolyte, are contained within a case 40, formed from a suitable plastic or other electrically insulating material. A cover 42 is bonded over an open end of case 40 to fully enclose the anode, cathode and electrolyte. A positive terminal 44 extends through cover 42 and is electrically connected to anode 36. A negative terminal 46 also extends through cover 42 and is electrically connected to cathode 38. A pressure relief vent 48 penetrates cover 42 to relieve excess gas pressure within case 40 when necessary. If desired, a catalytic converter 33 of the sort shown in FIG. 2 may also be included.

The anode 10 has a reactive metal surface. The anode surface can be formed from any suitable metal. Where an aqueous electrolyte 32 is used, metals in Group I of the periodic table (Li, Na, K, etc.) are generally unstable and undesirable. For best results, magnesium, aluminum, calcium, beryllium and alloys thereof are preferred. While a solid metal anode can be used, a graphite electrode plated with a suitable reactive metal is preferred. Woven graphite fibers, made rigid by the metal surface plating, makes a particularly desirable anode because of the greater surface area.

The cathode 20 comprises a mixture of about 10 to 90 weight percent finely divided sulfur and about 90 to 10 weight percent finely divided graphite packed about a solid graphite electrode. The mixture may be in the form of a self sustaining porous sintered body, if desired, typically formed by heating a mixture of graphite and sulfur particles to just the melting point of sulfur and cooling the mass. Alternatively, the mixture may be packed in a porous enclosure 28, typically a sheet of suitably porous plastic material, which may be a woven sheet or a perforated continuous sheet.

The electrolyte 32 basically comprises a metal salt solute as a source of metal ions, an ionic sulfide solute as a source of sulfide ions, both dissolved in an polar solvent which does not attack the case, anode or cathode.

Any suitable metal salt may be used. Preferably, the salt is a highly soluble metal salt of the same metal as a metal included in the anode. Typical salts of the anode metal include chlorides, bromides, iodides, perchlorates, nitrates and mixtures thereof. For example, with a magnesium anode, halides of magnesium, e.g., magnesium chloride or magnesium bromide, could be used, or with an aluminum anode, aluminum chloride, aluminum iodide, aluminum bromide or aluminum nitrate could be used. For best results with aluminum anodes, aluminum chloride or bromide give best results, while with magnesium anodes magnesium chloride or chlorate are optimum.

The ionic sulfide solute could use any suitable organic or metal-organic sulfide compound or a sulfide ion conditioning agent. Typical sulfide compounds include tetramethyl ammonium sulfide, stannous tartrate complexed with a sulfide, a stannous salt of ethylenediamine tetraacetic acid complexed with a sulfide, ditetraethyl ammonium sulfide, thioacetamide, hydrogen sulfide, chlorophyll complexed with a sulfide, hemoglobin complexed with a sulfide and mixtures thereof. Of these, best results are obtained with tetramethyl ammonium sulfide which is both highly stable and highly soluble. A concentration of from about 0.1 to 2.0M of sulfide compound in the solution is effective. For best results, this concentration generally should be in the 1.0 to 2.0M range because this concentration provides an optimum low internal resistance and improved current efficiency.

Any suitable polar solvent maybe used. Excellent results are obtained with water, propylene carbonate, ethanol, methanol, dimethylsulfoxide, 1,2-dimethoxy ethane, 2-methoxyethyl ether, ether, tetrahydrofuran and mixtures thereof. Of these, optimum performance is achieved with water, propylene carbonate and ethanol.

In order to increase the concentration of metal ions in solution, in particular with aluminum anodes, complexing agents may be added to the electrolyte. Typical complexing agents include potassium cyanide, sodium cyanide, organic sulfites (such as trimethylacetaldehyde, sodium sulfite, nitrogen dioxide and crown ethers) and mixtures thereof. For optimum battery operation, a concentration of from about 0.1 to 5.0M of the complexing agent in the electrolyte may be used.

To stabilize the aqueous cells, the electrolyte pH should be buffered to a pH between about 2 and 8. For optimum stability, the pH range should be between about 4 and 6. Any suitable buffering agent may be used. Typical such agents include acetic acid, ammonium acetate, boric acid, sulfurous acid with potassium sulfite, organic acids (such as citric acid, oxalic acid and malic acid) their salts and mixtures thereof. For optimum buffering, boric acid is preferred because of its high stability with reactive metals. Sufficient buffering agent should be used to adjust pH to the desired range.

Case 10 for this battery may be made from any suitable material that is not attacked by electrolyte 32. Typical case materials include polypropylene, polyethylene, polycarbonate, acrylonitrile-butadiene-styrene and combinations thereof. Optimally, polypropylene is used for an optimum combination of mechanical and chemical properties and low cost.

The following examples further point out preferred embodiments of the method of this invention. All parts and percentages are by weight unless otherwise indicated.

EXAMPLE I

A polycarbonate case is provided, configured as seen in FIG. 1 with a width of about 30 mm length of about 120 mm and height of about 90 mm. An anode is prepared by preparing a woven graphite sheet having a thickness of about 2 mm, a length of about 100 mm and a width of about 75 mm with a graphite rod secured to one edge and extending away from the sheet about 30 mm as a terminal. The sheet is electroplated with magnesium to a thickness of about 2 mm. The anode is placed in the case and secured in place in channels on the case interior walls.

A rectangular bag is made from polypropylene fiber fabric to a width of about 10 mm, length of about 100 mm and height of about 75 mm. A graphite sheet electrode, sized to fit within the bag and having a terminal extension, is placed in the bag. A mixture of finely divided graphite and sulfur is then packed into the bag around the electrode. The average particle sizes of the graphite and sulfur is about 0.5 mm, with the particles having irregular shapes. Five different such bags are made, having different ratios of graphite to sulfur. These bags have 5, 20, 50, 80 and 95 weight percent graphite with the balance sulfur.

An electrolyte is prepared by dissolving in 100 ml water about 50 g magnesium chloride and about 30 g tetramethyl ammonium sulfide. The electrolyte is buffered with boric acid to a pH of about 5.

The anode and electrolyte and, in order, each of the cathodes are placed in the case and the battery cell is charged by conventional DC charging methods. Tests of the different cathodes show that using 20, 50 and 80 weight percent graphite produce an excellent battery, while 5 wt % graphite makes an insufficiently conductive cathode and 95 wt % graphite shows low current density. Best results are obtained with about 40 wt % graphite.

EXAMPLE II

The experiment of Example I is repeated, with the 50 wt % graphite, 50 wt % sulfur cathode. Here, the electrolyte is prepared by dissolving about 50 g aluminum chloride in about 100 ml water containing about 20 g tetramethyl ammonium sulfide. The electrolyte is buffered with about 5 g of boric acid and about 20 g of potassium cyanide is added to the electrolyte as a complexing agent. This is found to increase the concentration of metal ions in the solution, increasing battery performance.

EXAMPLE III

An acrylonitrile-butadiene-styrene case is provided, configured as seen in FIG. 1. The dimensions of the case, anode and cathode are as described in Example I In this case, the anode is an aluminum plate having a portion of one edge extending away from the sheet as a terminal. The anode is placed in the case and secured in place by plastic mechanical fasteners.

A rectangular enclosure is made from microporous acrylic sheets. A woven graphite sheet electrode, sized to fit within the enclosure and having a terminal extension, is placed in the enclosure. A mixture of about 30 wt % finely divided graphite and 70 wt % finely divided sulfur is then packed into the enclosure around the electrode. The average particle sizes of the graphite and sulfur is about 0.05 mm, with the particles having approximately spherical shapes.

An electrolyte is prepared by dissolving in about 100 ml propylene carbonate about 30 g aluminum bromide and about 40 g ammonium sulfide.

The anode, cathode and electrolyte are placed in the case and the battery cell is charged. Upon testing, it is found to have high energy density and good charge/discharge rates.

EXAMPLE IV

The method of Example III is repeated except that the electrolyte is about 100 ml propylene carbonate in which about 25 g sodium chloride and about 20 g tetramethyl ammonium sulfide are dissolved. The cathode is a mixture of about 50 wt % each sodium sulfide and graphite particles in a porous woven bag surrounding a woven graphite electrode. An excellent high capacity battery results.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

We claim:

1. A high energy capacity battery which comprises:

a case;

at least one cathode comprising a mixture of about 10 to 90 weight percent finely divided sulfur and about 90 to 10 weight percent finely divided graphite packed about a solid graphite electrode positioned in said case;

at least one anode comprising at least one reactive metal, spaced from said cathode positioned in said case; and an electrolyte at least partially filling said case and in contact with said cathode and said anode, said electrolyte comprising:

a metal salt solute as a source of metal ions;

an ionic sulfide solute as a source of sulfide ions;

a polar solvent in which said metal salt and ionic sulfide solutes are soluble and said anode, cathode and case are insoluble.

2. The battery according to claim 1 wherein said electrolyte further includes a complexing agent.

3. The battery according to claim 2 wherein said complexing agent is selected from the group consisting of potassium cyanide, sodium cyanide, organic sulfites and mixtures thereof.

4. The battery according to claim 1 wherein said mixture is enclosed within a porous container formed from a material selected from woven fabric, non-woven fabric, porous continuous sheet material and combinations thereof.

5. The battery according to claim 1 wherein said polar solvent is selected from the group consisting of water, propylene carbonate, ethanol, methanol, dimethyl sulfoxide, ether, tetrahydrafuran and mixtures thereof.

6. The battery according to claim 1 wherein said electrolyte includes a buffering agent in sufficient quantity to maintain the pH of said electrolyte at between about 2 and 8.

7. The battery according to claim 1 wherein said electrolyte includes a buffering agent in sufficient quantity to maintain the pH of said electrolyte at between about 4 and 6.

8. The battery according to claim 7 wherein said buffering agent is selected from the group consisting of acetic acid, ammonium acetate, boric acid, organic acids and salts and mixtures thereof.

9. The battery according to claim 1 wherein said ionic sulfide solute is selected from the group consisting of organic sulfide compounds, metal-organic sulfide compounds, sulfide ion complexing agents and mixtures thereof.

10. The battery according to claim 1 wherein said ionic sulfide solute is from about 1 to 2.0M tetramethyl ammonium sulfide in said polar solvent.

11. The battery according to claim 1 wherein said anode comprises a graphite electrode plated with a reactive metal.

12. The battery according to claim 11 wherein said graphite electrode is a woven graphite sheet and said reactive metal is selected from the group consisting of magnesium, aluminum, beryllium and mixtures or combinations thereof.

13. The battery according to claim 1 wherein said mixture comprises about 40 to 60 weight percent finely divided sulfur and about 60 to 40 weight percent finely divided graphite.

14. The battery according to claim 1 wherein said metal salt is selected from the group consisting of chlorides, bromides, iodides, perchlorates, nitrates and mixtures thereof.

15. A method of making a high energy capacity battery which comprises the steps of:
    providing a case configured to hold a quantity of liquid;
    forming a cathode by:
        mixing about 10 to 90 weight percent finely divided sulfur and about 90 to 10 weight percent finely divided graphite;
        packing said mixture around a graphite electrode; and
        surrounding the mixture with a porous separator;
    inserting said cathode into said case;
    inserting an anode formed from at least one reactive metal into said case, spaced from said cathode;
    forming an electrolyte by mixing together a metal salt solute, an ionic sulfide solute and a polar solvent which dissolves said metal salt solute and ionic sulfide solute but does not dissolve said anode, cathode and case; and
    pouring said electrolyte into said case to at least partially fill said case and contact said anode and cathode.

16. The method according to claim 15 further includes adding a complexing agent to said electrolyte.

17. The method according to claim 16 wherein said complexing agent is selected from the group consisting of potassium cyanide, sodium cyanide, organic sulfites and mixtures thereof.

18. The battery according to claim 15 wherein said polar solvent is selected from the group consisting of water, propylene carbonate, ethanol, methanol, dimethyl sulfoxide, ether, tetrahydrafuran and mixtures thereof.

19. The method according to claim 15 wherein a buffering agent is added to said electrolyte in sufficient quantity to maintain the pH of said electrolyte at between about 2 and 8.

20. The method according to claim 15 wherein a buffering agent is added to said electrolyte in sufficient quantity to maintain the pH of said electrolyte at between about 4 and 6.

21. The method according to claim 20 wherein said buffering agent is selected from the group consisting of boric acid, organic acids and salts and mixtures thereof.

22. The method according to claim 15 wherein said ionic sulfide solute is selected from the group consisting of organic sulfide compounds, metal-organic sulfide compounds, sulfide ion complexing agents and mixtures thereof.

23. The battery according to claim 15 wherein said ionic sulfide solute is from about 1.0 to 2.0M tetramethyl ammonium sulfide in said polar solvent.

24. The method according to claim 15 wherein said anode is formed by plating a graphite electrode with a reactive metal.

25. The battery according to claim 24 wherein said graphite electrode is a woven graphite sheet and said reactive metal is selected from the group consisting of magnesium, aluminum, beryllium and mixtures or combinations thereof.

26. The method according to claim 15 wherein said mixture comprises about 40 to 60 weight percent finely divided sulfur and about 60 to 40 weight percent finely divided graphite.

27. The method according to claim 15 wherein said metal salt is selected from the group consisting of chlorides, bromides, iodides, nitrates, perchlorates and mixtures thereof.

* * * * *